(12) United States Patent
Chuang et al.

(10) Patent No.: US 6,971,111 B2
(45) Date of Patent: Nov. 29, 2005

(54) DISC APPARATUS WITH DEVICE FOR PREVENTING EJECTION OF A CRACKED DISC

(75) Inventors: Cheng-Chieh Chuang, Sanchong (TW); Hsien-Tsung Chiu, Gueishan (TW); Chiu-An Huang, Baojhong (TW)

(73) Assignee: Benq Corporation, Taoyuan (TW)

( * ) Notice: Subject to any disclaimer, the term of this patent is extended or adjusted under 35 U.S.C. 154(b) by 156 days.

(21) Appl. No.: 10/603,901

(22) Filed: Jun. 25, 2003

(65) Prior Publication Data

US 2004/0047266 A1   Mar. 11, 2004

(30) Foreign Application Priority Data

Jun. 25, 2002   (TW) ............................... 91113858 A

(51) Int. Cl.[7] ............................................. G11B 17/04
(52) U.S. Cl. ..................................................... 720/601
(58) Field of Search ................................ 720/601, 602, 720/603, 646; 360/97.02; 369/75.1, 75.2

(56) References Cited

U.S. PATENT DOCUMENTS

| 6,028,832 | A  | * | 2/2000  | Hojo et al. ................. 720/647 |
| 6,560,184 | B2 | * | 5/2003  | Shida et al. ................ 720/603 |
| 6,650,609 | B2 | * | 11/2003 | Omori et al. ............... 720/649 |
| 6,700,850 | B2 | * | 3/2004  | Takahashi et al. .......... 720/601 |
| 2002/0051418 | A1 | * | 5/2002  | Takahashi et al. ......... 369/75.2 |
| 2002/0093899 | A1 | * | 7/2002  | Omori et al. .............. 369/75.1 |

* cited by examiner

Primary Examiner—William Korzuch
(74) Attorney, Agent, or Firm—Snell & Wilmer L.L.P.

(57) ABSTRACT

An apparatus for preventing a cracked disc from flying out of a disc data reading apparatus is provided. The apparatus includes a housing and a panel. The panel selectively connects with the housing. The housing has a protrusion connecting with a front edge of the housing. The panel has a first surface corresponding to the protrusion. While the disc within the disc data reading apparatus cracks, a force existing between the protrusion and the first surface prevents a cracked disc flying out.

20 Claims, 8 Drawing Sheets

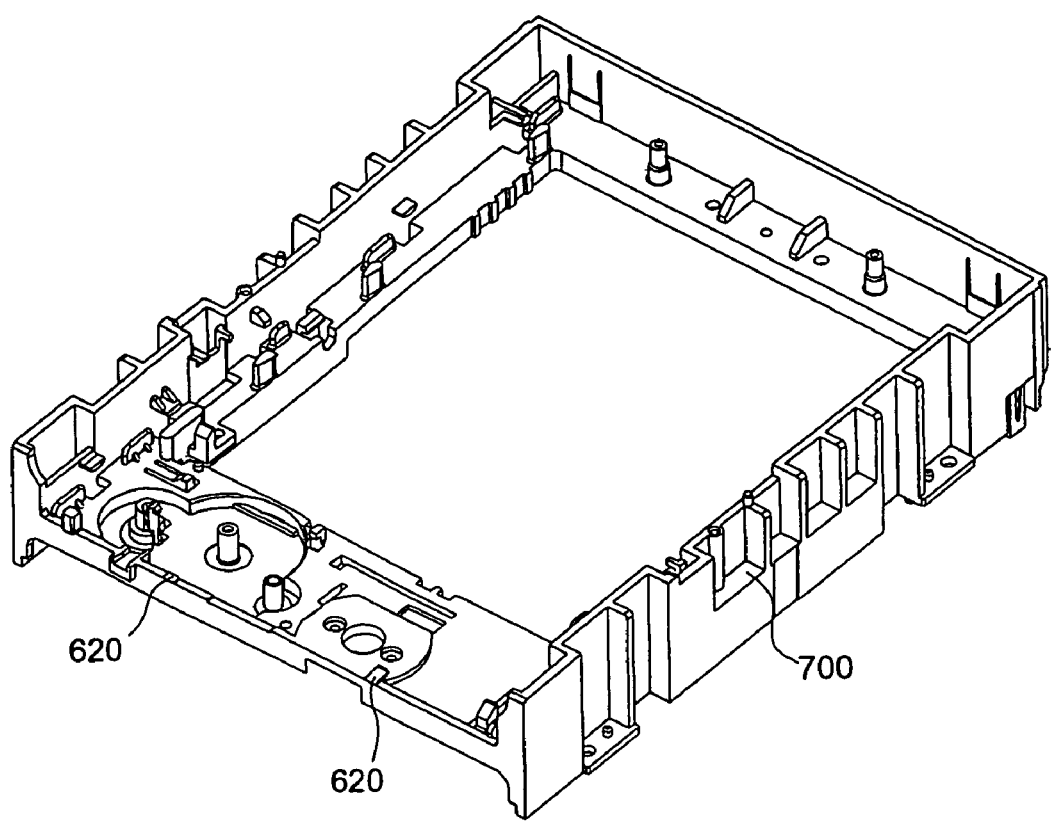
4b

DISC APPARATUS WITH DEVICE FOR PREVENTING EJECTION OF A CRACKED DISC

This application claims priority of Taiwan Patent Application No. 091113858 filed on Jun. 25, 2002.

FIELD OF INVENTION

The present invention relates to an apparatus for preventing a cracked disc from flying out of a disc data reading apparatus and a disc data reading device including the apparatus.

BACKGROUND OF THE INVENTION

In past few years, the rotation speed of disc data reading apparatuses has rapidly increased. However, because of the unstable qualities of re-writable discs and increased rotation speed, the discs are easier to crack during rotation. In addition, accidents caused by ejected cracked discs have also rapidly increased. Hence how to prevent the cracked discs flying out of the disc data reading apparatuses is important when designing the structure of the disc data reading apparatuses.

Generally, the ejected cracked discs pass through a chink between the tray and the housing and damage the panel and cover. Conventionally, the front edge of the housing is bent downward to block the cracked discs. However, the energy generated while the discs crack usually presses the tray down, and then the cracked discs are able to pass from the underside of the front edge of the housing.

To solve this problem, some support points are disposed under the tray. While the energy forces the tray downward, the support points touch the chassis and receive a reaction force for limiting the downward displacement of the tray.

However, besides the tray, the energy also forces the housing upward. Therefore the problem of ejected cracked discs still exists.

SUMMARY OF THE INVENTION

It is an aspect of the present invention to provide an apparatus for use with a disc data reading apparatus and preventing a cracked disc from flying out of the apparatus.

It is another aspect of the present invention to limit the displacement of the housing while the disc cracks.

It is another aspect of the present invention to limit the displacement of the tray while the disc cracks.

The present invention provides an apparatus for use with a disc data reading apparatus. In the first embodiment, the apparatus of the present invention includes a housing and a panel. The panel selectively connects with the housing. The housing has a protrusion, which connects with a front edge of the housing. The panel has a first surface corresponding to the protrusion. While the disc within the disc data reading apparatus cracks, a force existing between the protrusion and the first surface limits relative displacement of the panel and the housing for preventing a cracked disc flying out.

In addition, the housing includes a stopper for blocking the cracked disc. The stopper extends downward from the front edge of the housing.

The present invention further includes a tray and a chassis. The tray includes at least one support point. As the disc becomes cracked, the support point touches against the chassis and receives a reaction force limiting relative displacement between the tray and the chassis.

In the second embodiment, differing from the first embodiment, an inner side edge of the panel connects the protrusion, and the housing has the first surface corresponding to the protrusion.

The present invention further provides a disc data reading apparatus using the apparatus mentioned above.

This and other aspects of the present invention will become clear to those of ordinary skills in the art after having read the following detailed description of the preferred embodiments illustrated in the various figures and drawings.

BRIEF DESCRIPTION OF THE DRAWINGS

FIG. 4b shows a perspective view of the chassis;

FIG. 5b shows a profile taken along line II–II' of FIG. 5a; and

DETAILED DESCRIPTION

Figure 1:
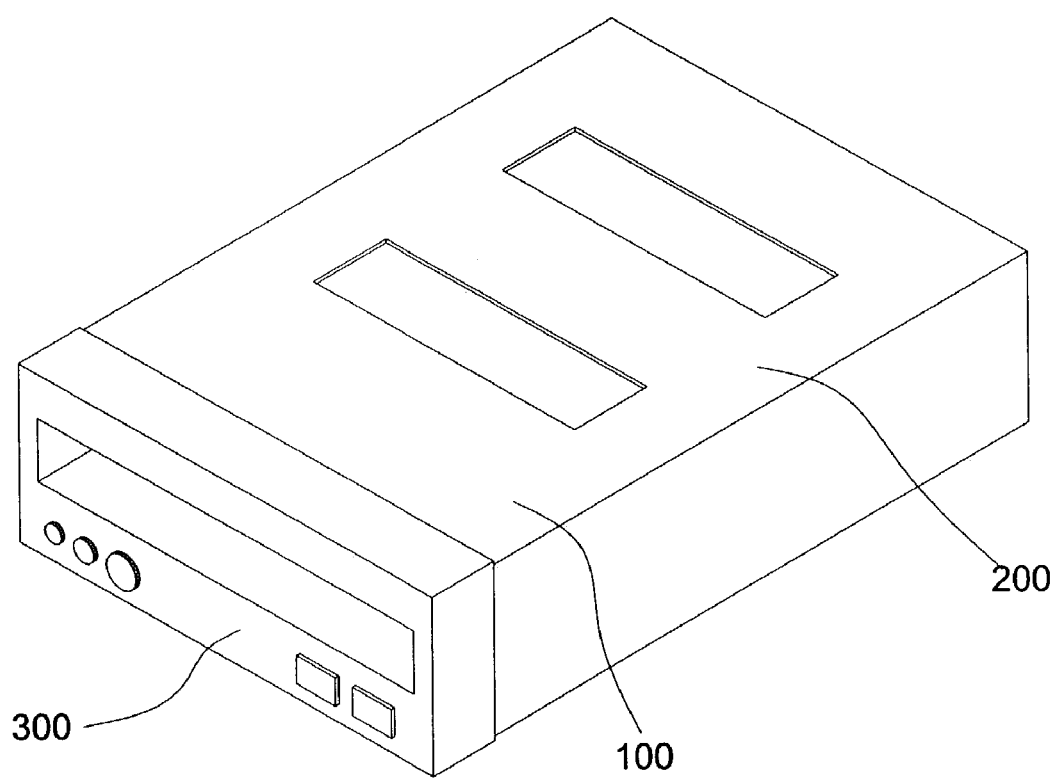
FIG. 1 shows a perspective view of the disc data reading apparatus.

The present invention provides an apparatus for use with a disc data reading apparatus 100 shown in FIG. 1. The apparatus of the present invention prevents a cracked disc from flying out when a disc within the disc data reading apparatus 100 cracks. The disc data reading apparatus 100 mentioned here may include a CD-ROM, a CD-R, a CD-RW, a DVD player, or other resemblances. The following description discloses several preferred embodiments of the present invention.

First Embodiment

Figure 2A:
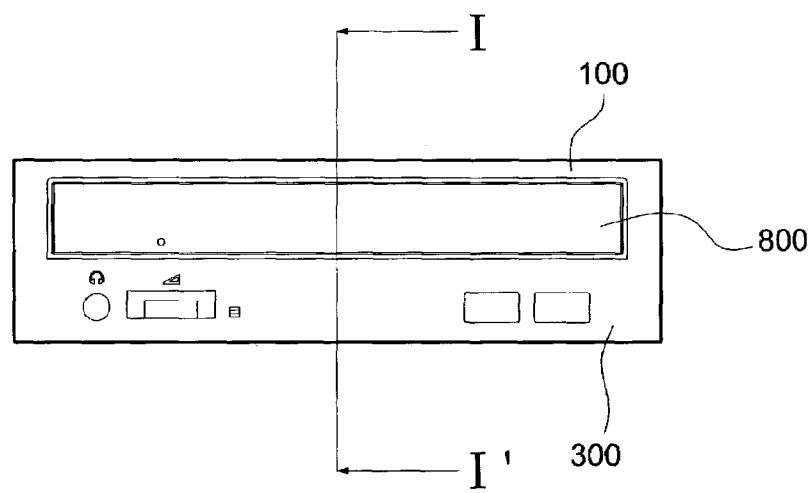
FIG. 2a shows a front view of the first embodiment of the present invention.
Figure 2B:
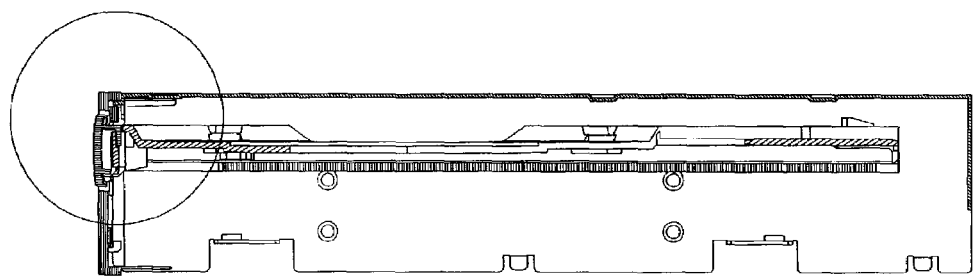
FIG. 2b shows a cross-section profile of the embodiment of FIG. 2a taken along line I–I'.
Figure 2C:
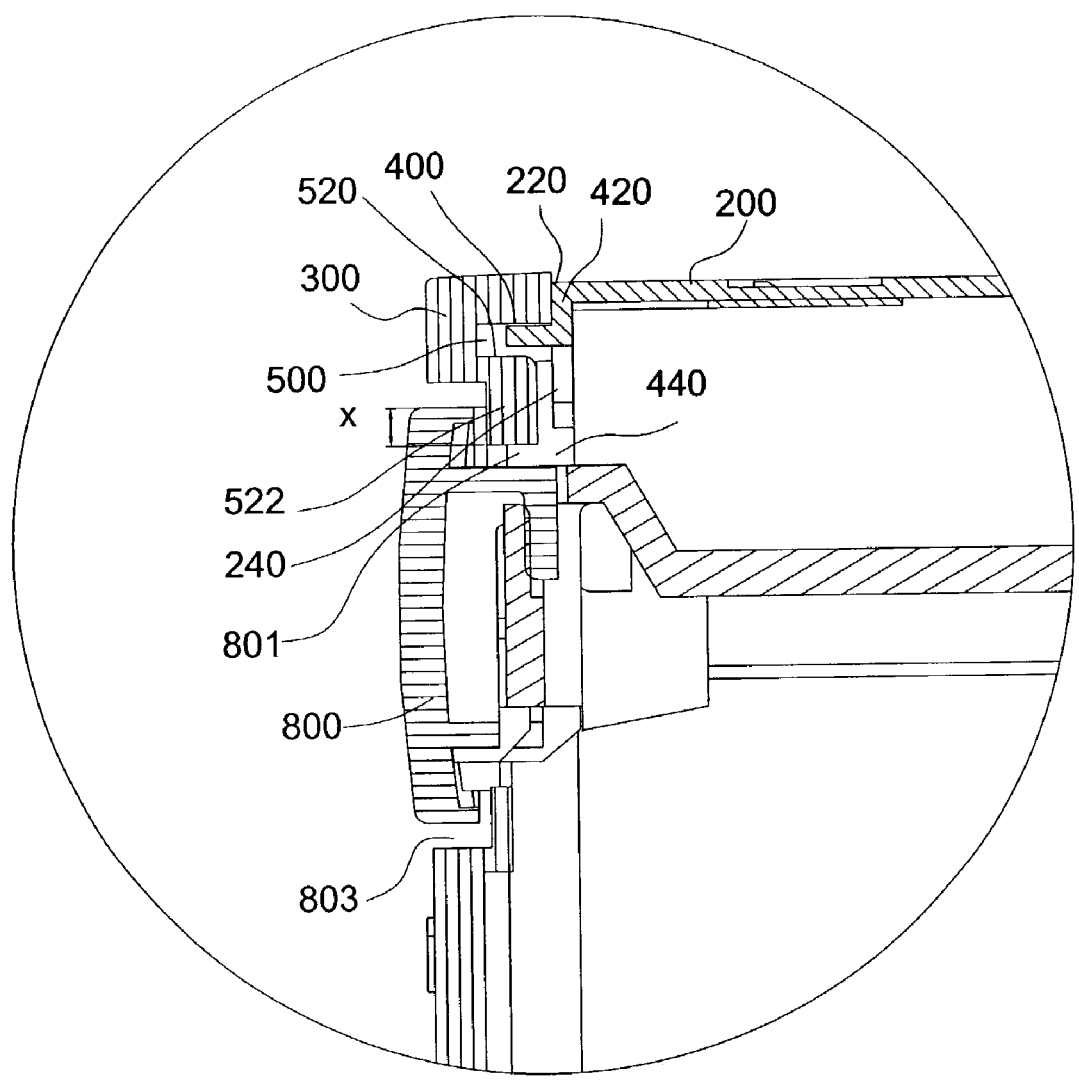
FIG. 2c shows a magnification view of a portion of the profile illustrated in FIG. 2b.

The description hereafter refers to FIG. 2a, FIG. 2b, and FIG. 2c. The apparatus of the present invention includes a housing 200 and a panel 300. The housing 200 has a protrusion 400, which connects with a front edge 220 of the housing 200. The protrusion 400 may have a slab shape, a spherical shape, a half-spherical shape, or other resemblances. In the embodiment illustrated in FIG. 2c, the protrusion 400 extends downward from the front edge 220 for a first interval 420, and then turns toward the panel 300. In other words, the protrusion 400 has an L-shaped profile. However, in other embodiments, the protrusion 400 may extend from the edge 220 and directly toward the panel 300. In addition, the protrusion 400 horizontally extend toward the panel 300; however, in other embodiments, the protrusion 400 may extend along an inclination.

The panel 300 selectively connects with the front edge 220 of the housing 200. In this embodiment, the panel 300 is removably connected with the front edge 220. The panel 300 includes a first surface 520 corresponding to the protrusion 400. Particularly, the first surface 520 corresponds to and contacts a side of the protrusion 400 when the housing 200 connects the panel 300. When a disc within the disc data reading apparatus 100 cracks, the concurrently generated energy forces the housing 200 and a tray 600 oppositely move or deform. The stopper 240 blocks most of the cracked pieces, and the other pieces fly toward the panel 300 through a chink 440 formed by the stopper 240 and the tray 600. Those escaped pieces then force the panel 300 to move upward and the cover 800 to move downward so as to broaden the seam between the panel 300 and the cover 800. When the panel 300 and the cover 800 oppositely move, the first surface 520 contacts with the protrusion 400. The contact generates a force to limit relative displacement between the panel 300 and the cover 800 for preventing the cracked pieces flying out. In addition, an extension 522 of the first surface 520 overlaps the cover 800 with a specific interval X, and a chink 803, which is smaller than X, is between the cover 800 and the panel 300. While the cover 800 moves downward and contacts with the panel 300 to eliminate the chink 803, the extension 522 still overlaps the cover 800 to block the cracked pieces.

As FIG. 2c shows, the panel 300 further has a depression 500. In this embodiment, the depression 500 is a slot, which is parallel with the surface of the disc. The first surface 520 is a sidewall of the depression 500. When the housing 200 connects with the panel 300, the depression 500 receives the protrusion 400, and the sidewall of the depression 500, i.e. the first surface 520, corresponds to a side of the protrusion 400.

Figure 3:
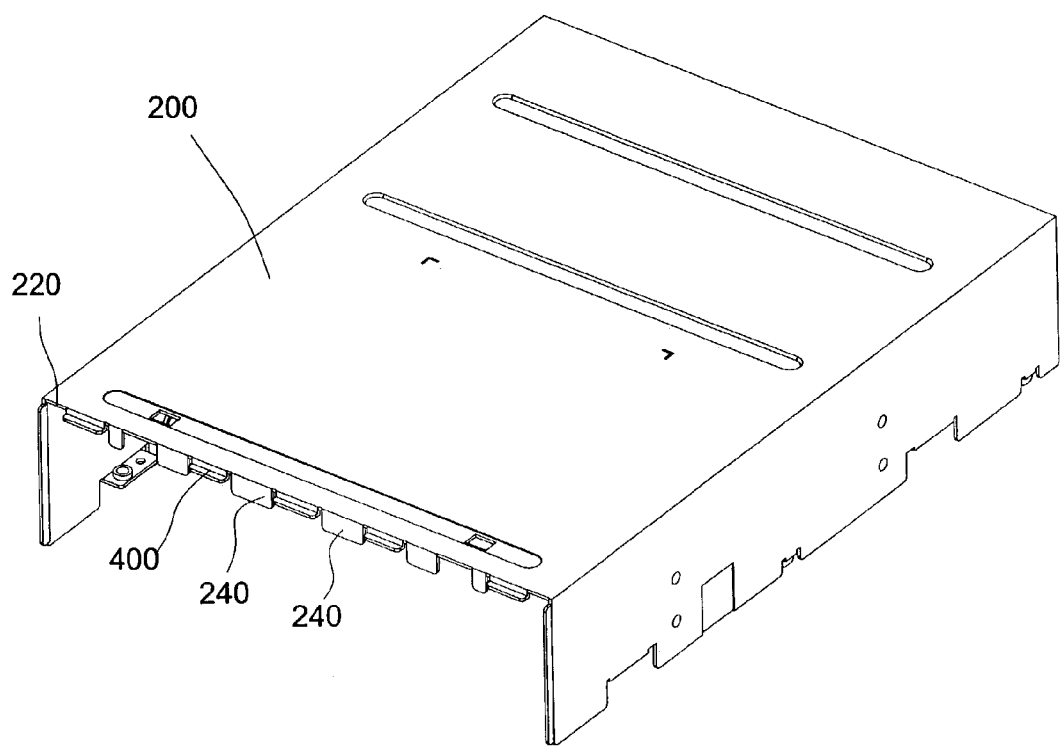
FIG. 3 shows the housing in accordance with a first embodiment.
Figure 4A:
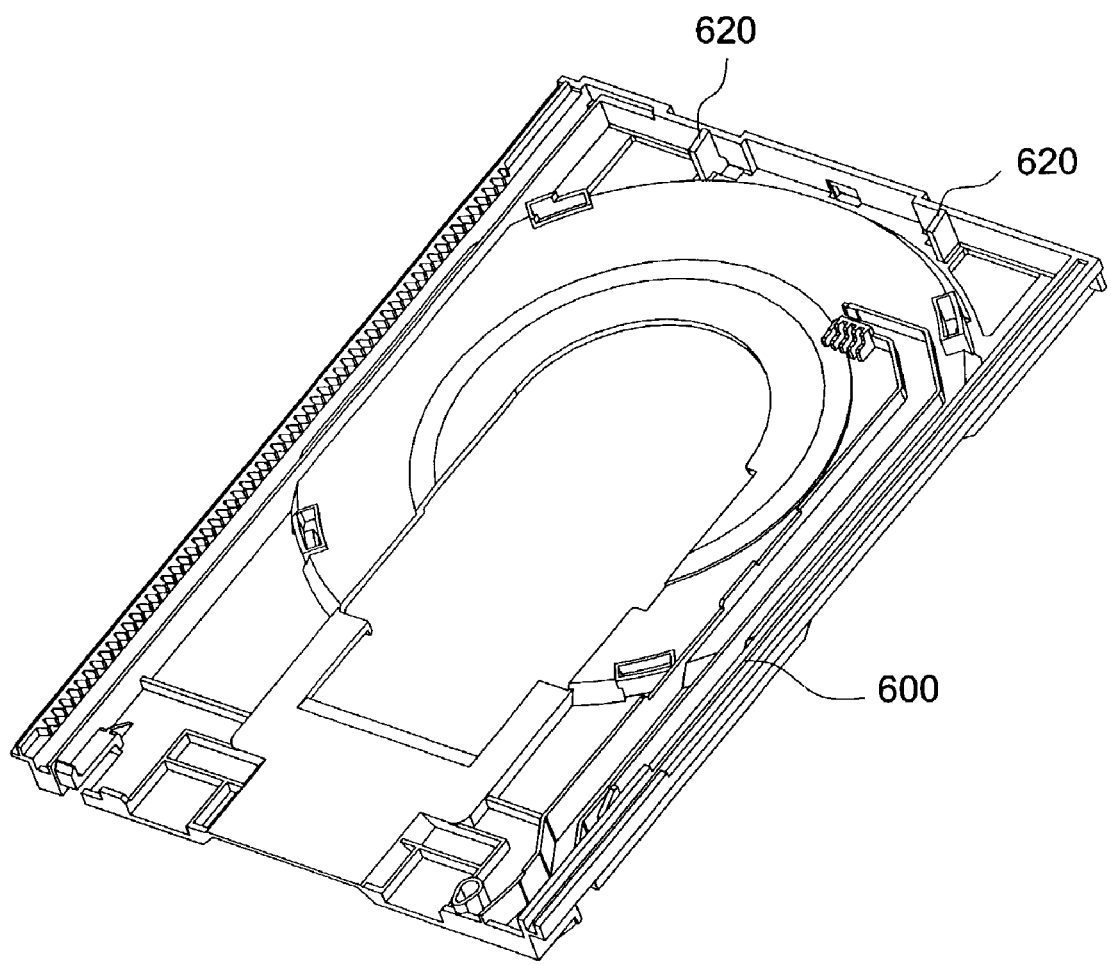
FIG. 4a shows a bottom view of the tray.
Figure 5A:
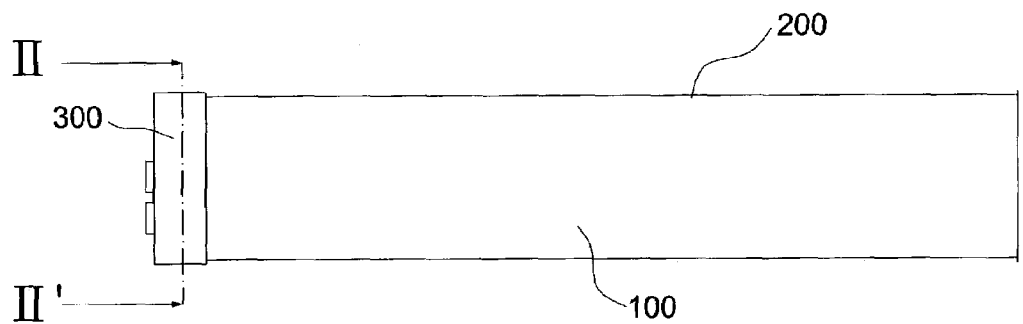
FIG. 5a shows aside view of the first embodiment.
Figure 5B:
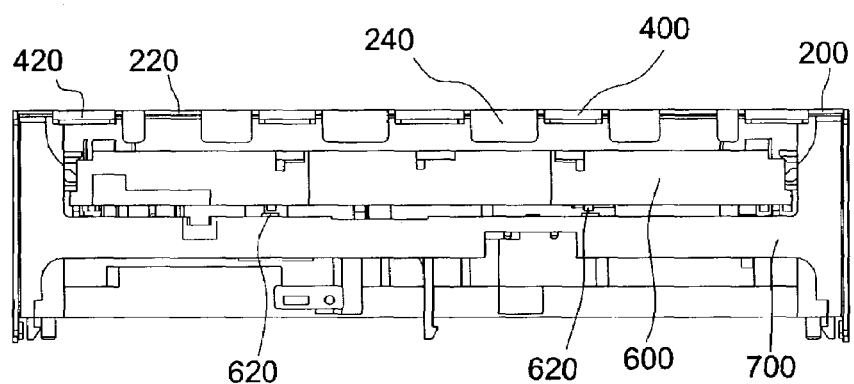

As FIG. 3 shows, the stopper 240 connects with the front edge 220 of the housing 200 and extends downward. The stopper 240 mentioned above may include a plate structure, a net structure, or other similar structures. In this embodiment, the stopper 240 is a plate structure and aligned with the protrusion 400 alternately.

As FIG. 4a, FIG. 4b, FIG. 5a and FIG. 5b show, the present invention further includes a tray 600 for holding the disc and a chassis 700 for supporting the tray 600. The tray 600 has at least one support point 620. The support point 620 mentioned above may include various kinds of appearances, such as sphere, half-sphere, cross, or other resemblances. As the disc becomes cracked, the support point 620 touches against the chassis 700 and receives a reaction force limiting relative displacement between the tray 600 and the chassis 700. In other embodiments, however, the support point 620 may be arranged on the chassis 700 and touch against the tray 600. Moreover, the support points 620 may be arranged both on the tray 600 and the chassis 700 and contact with each other to provide a reaction.

Second Embodiment

Figure 6:
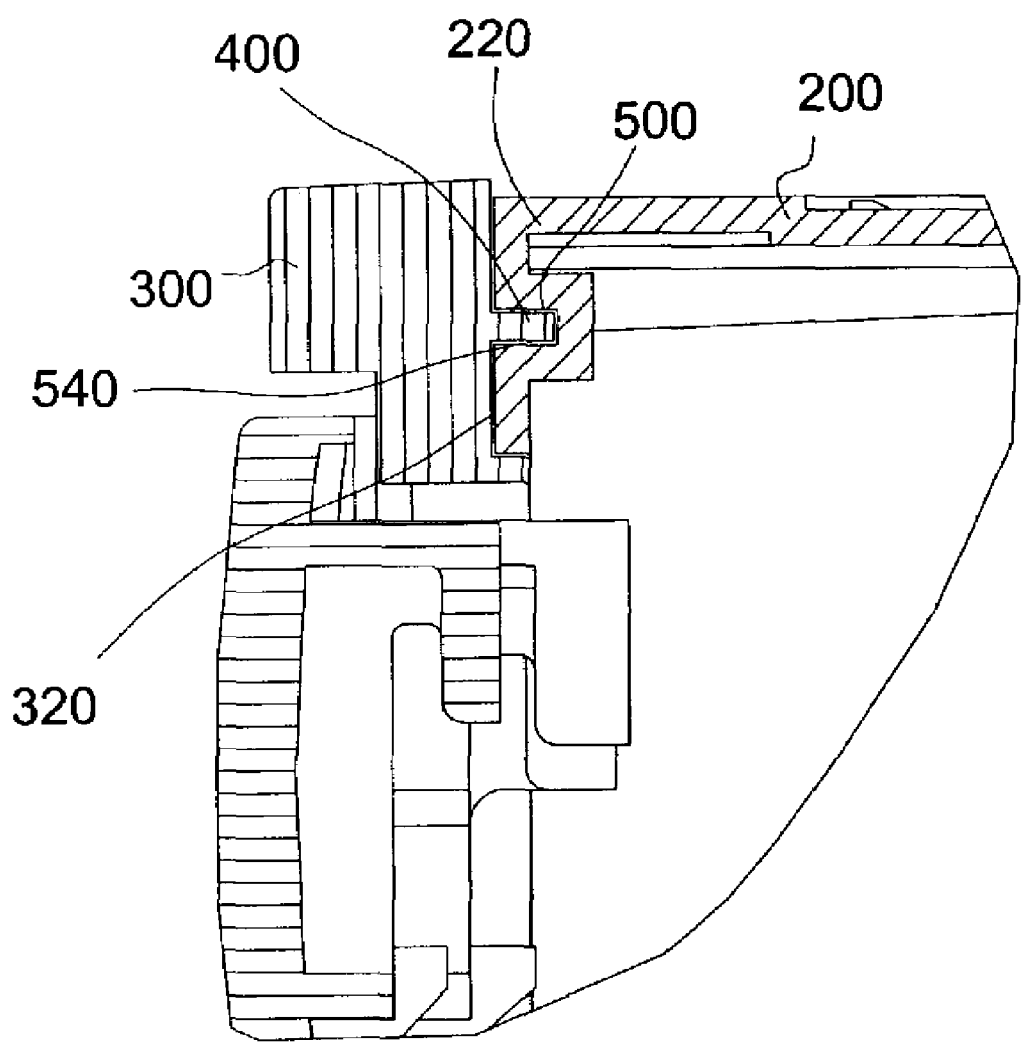
FIG. 6 shows a second embodiment of the present invention.

As FIG. 6 shows, the difference between the first and the second embodiments is that the panel 300 has a protrusion 400 and the housing 200 has the first surface 540 corresponding to the protrusion 400. The protrusion 400 extends from a side edge 320 of the panel 300. The protrusion 400 may have a slab shape, a spherical shape, a half-spherical shape, or other resemblances. As FIG. 6 shows, the protrusion 400 extends from the side edge 320 and toward the housing 200. In addition, the protrusion 400 horizontally extend toward the panel 300, however, in another embodiments, the protrusion 400 may extend along an inclination.

The housing 200 selectively connects with the side edge 320 of the panel 300. In this embodiment, the housing 200 is removably connected with the side edge 320. The first surface 540 corresponds to and contact with a side surface of the protrusion 400 when the housing 200 connects with the panel 300. When a disc within the disc data reading apparatus 100 cracks, the concurrently generated energy forces the housing 200 and a tray 600 respectively move or deform in opposite directions. In the meantime, the first surface 540 contacts with the protrusion 400. The contact generates a force to limit relative displacement between the panel 300 and the housing 200 for preventing the cracked pieces from flying out.

As FIG. 6 shows, the housing 200 further has a depression 500. In this embodiment, the depression 500 is a slot, which is parallel with the surface of the disc. The first surface 540 is a sidewall of the depression 500. When the housing 200 connects with the panel 300, the depression 500 receives the protrusion 400, and the sidewall of the depression 500, i.e. the first surface 540, corresponds to a side surface of the protrusion 400.

Those skilled in the art will readily observe that numerous modifications and alterations of the device may be made within the teaching of the invention. Accordingly, the above disclosure should be construed as limited only by the metes and bounds of the appended claims.

What is claimed is:

1. An apparatus for use with a disc data reading apparatus, comprising:
    a housing having a rigid stopper, a front edge and a protrusion connected to the front edge, the rigid stopper being connected to the front edge and extending downward from the front edge for blocking a cracked disc; and
    a panel, the panel being selectively connected to the front edge, the panel having a first surface corresponding to the protrusion and an extension surface corresponding to the rigid stopper, and the rigid stopper partially covering the extension surface of the panel;
    wherein, the housing, the rigid stopper, and the protrusion are formed integrally, and wherein a force existing between the protrusion and the first surface limits relative displacement between the panel and the housing for preventing the cracked disc flying out of the disc data reading apparatus.

2. The apparatus of claim 1, wherein the panel further comprises a depression, the first surface being a side-wall of the depression, as the housing is connected to the panel, the protrusion is received within the depression.

3. The apparatus of claim 1, further comprising a tray and a chassis, the tray including a support point, as the disc becomes cracked, the support point touches against the chassis and receives a reaction force limiting relative displacement between the tray and the chassis.

4. The apparatus of claim 1, further comprising a tray and a chassis, the chassis including a support point, as the disc becomes cracked, the support point touches against the tray and receives a reaction force limiting relative displacement between the tray and the chassis.

5. The apparatus of claim 1, wherein the housing further comprises a plurality of protrusions and a plurality of rigid stoppers alternately arranged.

6. An apparatus for use with a disc data reading apparatus, comprising:
    a panel having an extension surface, a side edge and a protrusion connected to the side edge; and
    a housing, the housing being selectively connected to the side edge, the housing having a rigid stopper and a first surface corresponding to the protrusion, the rigid stopper being connected to a front edge of the housing, extending downward from the front edge, and partially covering the extension surface of the panel for blocking the cracked disc;
    wherein, the housing and the rigid stopper are formed integrally, and wherein a force existing between the protrusion and the first surface limits relative displacement between the panel and the housing for preventing the cracked disc from flying out of the disc data reading apparatus.

7. The apparatus of claim 6, wherein the housing further comprises a depression, the first surface being a side-wall of the depression, as the housing is connected to the panel, the protrusion is received within the depression.

8. The apparatus of claim 6, further comprising a tray and a chassis, the tray including a support point, as the disc becomes cracked, the support point touches against the chassis and receives a reaction force limiting relative displacement between the tray and the chassis.

9. The apparatus of claim 6, further comprising a tray and a chassis, the chassis including a support point, as the disc becomes cracked, the support point touches against the tray and receives a reaction force limiting relative displacement between the tray and the chassis.

10. The apparatus of claim 6, wherein the housing further comprises a plurality of protrusions and a plurality of rigid stoppers alternately arranged.

11. A disc data reading apparatus comprising:
a housing having a rigid stopper and an opening, the opening defining a front edge and the front edge extending to form a protrusion, the rigid stopper being connected to the front edge and extending downward from the front edge for blocking a cracked disc; and
a panel, the panel being selectively connected to the front edge, the panel including a first surface corresponding to the protrusion and an extension surface corresponding to the rigid stopper, and the rigid stopper partially covering the extension surface of the panel;
wherein, the housing, the rigid stopper, and the protrusion are formed integrally, and wherein a force existing between the protrusion and the first surface limits relative displacement between the panel and the front edge for preventing the cracked disc flying out of the disc data reading apparatus.

12. The disc data reading apparatus of claim 11, wherein the panel further comprises a depression, the first surface being a side-wall of the depression, as the front edge is connected to the panel, the protrusion is received within the depression.

13. The disc data reading apparatus of claim 11 further comprising a tray and a chassis, the tray including a support point, as the disc becomes cracked, the support point touches against the chassis and receives a reaction force limiting relative displacement between the tray and the chassis.

14. The disc data reading apparatus of claim 11, further comprising a tray and a chassis, the chassis including a support point, as the disc becomes cracked, the support point touches against the tray and receives a reaction force limiting relative displacement between the tray and the chassis.

15. The disc data reading apparatus of claim 11, wherein the housing further comprises a plurality of protrusions and a plurality of rigid stoppers alternately arranged.

16. An disc data reading apparatus comprising:
a panel having an extension surface and a side edge provided with a protrusion; and
a housing having a rigid stopper and an opening, the opening defining a front edge selectively attaching to the side edge, the front edge being provided with a first surface corresponding to the protrusion, the rigid stopper being connected to the front edge, extending downward from the front edge, and partially covering the extension surface of the panel for blocking a cracked disc;
wherein, the housing and the rigid stopper being formed integrally, and wherein a force existing between the protrusion and the first surface limits relative displacement between the panel and the housing for preventing the cracked disc from flying out of the disc data reading apparatus.

17. The disc data reading apparatus of claim 16, wherein the housing further comprises a depression, the first surface being a side-wall of the depression, as the housing is connected to the panel, the protrusion is received within the depression.

18. The disc data reading apparatus of claim 16 further comprising a tray and a chassis, the tray including a support point, as the disc becomes cracked, the support point touches against the chassis and receives a reaction force limiting relative displacement between the tray and the chassis.

19. The disc data reading apparatus of claim 16, further comprising a tray and a chassis, the chassis including a support point, as the disc becomes cracked, the support point touches against the tray and receives a reaction force limiting relative displacement between the tray and the chassis.

20. The disc data reading apparatus of claim 16, wherein the housing further comprises a plurality of protrusions and a plurality of rigid stoppers alternately arranged.

* * * * *